Aug. 26, 1947.  G. L. FERNSLER  2,426,193
RADIO TRANSMITTER AUTOMATIC VOLUME CONTROL
Filed June 17, 1943
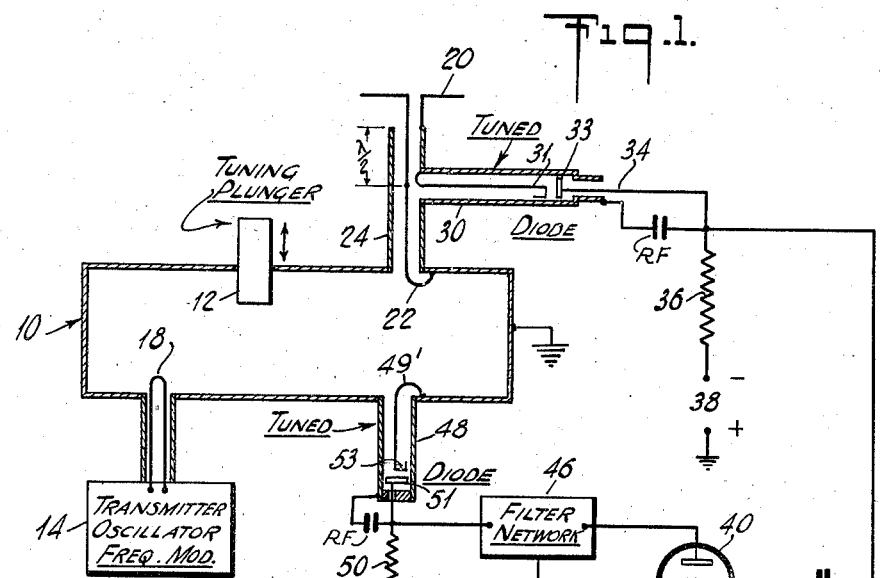
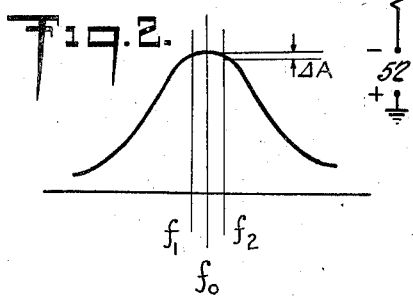
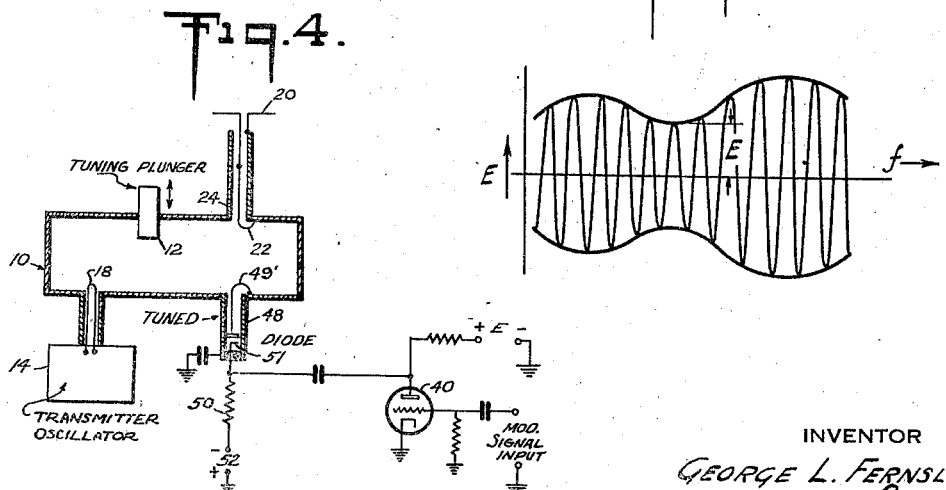
INVENTOR
GEORGE L. FERNSLER.
BY H. S. Grover
ATTORNEY Patented Aug. 26, 1947

2,426,193

UNITED STATES PATENT OFFICE 2,426,193

RADIO TRANSMITTER AUTOMATIC VOLUME CONTROL

George L. Fernsler, Lawrenceville, N. J., assignor to Radio Corporation of America, a corporation of Delaware Application June 17, 1943, Serial No. 491,139

7 Claims. (Cl. 250—17)

This application discloses a new and improved signalling system wherein wave energy of very short wave length is modulated as to its timing or as to its amplitude.

In the system disclosed, when the short wave length wave energy is modulated as to its timing, undesired amplitude variations thereon are suppressed and reduced.

An object of my invention is to provide a new and improved timing modulation system, including improved means for reducing amplitude variations in timing modulated wave energy of very high frequency.

In my improved system the above object is attained by feeding timing modulated oscillatory energy of very high frequency, say 10 cm wavelength, to a resonant cavity for amplification purposes. The timing modulated oscillations may have thereon amplitude variations which it is desired to remove. Peaks of the timing modulated energy which exceed a selected permissible magnitude are used to provide control potentials when the amplitude or magnitude of the wave energy exceeds said selected value. These control potentials act on an impedance coupled into the cavity resonator to lower this impedance. This lowers the effective Q of the cavity and this reduction of the effective Q of the cavity in combination with the change in the impedance coupled in to the cavity which absorbs energy from the cavity holds the wave energy amplified therein below said selected peak value.

Another object of my invention is to provide a new and improved system for modulating the amplitude of wave energy of very high frequency.

This object is attained by feeding to the resonant cavity unmodulated oscillations of high frequency for amplification therein, and by controlling the said impedance coupled into said resonant cavity in accordance with modulating potentials to thereby control the Q of the cavity and the amount of energy diverted or drawn or absorbed from the resonant cavity to correspondingly control the magnitude of the oscillatory energy fed from the cavity to the output.

The manner in which above and additional objects are attained will appear from the detailed description which follows.

In this description reference will be made to the attached drawing, wherein Fig. 1 illustrates schematically and by wiring diagram a system arranged in accordance with my invention.

Fig. 2 illustrates graphically the timing modulated output of a line coupled into the cavity resonator.

Fig. 3 illustrates graphically the manner in which the system is adjusted to reduce amplitude variations in a timing modulated wave, while Fig. 4 is a modification of the arrangement of Fig. 1.

In the drawings, 10 represents a hollow cavity of any cross-section shape, the inner wall of which, at least, is of conductive material and which is substantially closed, so that energy fed thereto or developed therein is not wastefully dissipated therefrom. The chamber may be operated at resonance or off resonance. Preferably it is operated at resonance, and in this case it is properly shaped and dimensioned to produce enclosed space resonance of the electromagnetic waves, set up or produced, at the desired frequency of operation. The resonant cavity, per se, is known in the prior art, as is the manner in which the dimensions of the cavity, the material of which it is made, its load, etc., determines the wave length at which it will operate. For example, see "A Type of Electrical Resonator," by W. W. Hansen, J. A. P., vol. 9, Oct. 1938, page 654.

The resonant cavity has adjustably positioned therein a tuning plunger 12 by means of which the space dimensions and as a consequence the frequency at which the cavity resonates may be adjusted.

In the modification illustrated high frequency oscillations are supplied from a transmission oscillator in unit 14 by means of a coupling loop 18. The position of this loop in the cavity also determines, in part at least, the resonance frequency thereof.

The length of line between 14 and 18 is not critical if the line is matched into the cavity 10 by properly adjusting the loop (which is critical) such that a match is obtained between line and cavity. This is done by varying the depth of insertion of the loop in the cavity. The termination impedance of the loop is primarily a function of the area of the loop within the cavity. The coupled impedance of a loop in a cavity is given by the relation $$Z_m = 6.8 \left(\frac{\epsilon}{az_0}\right) 2\frac{z_0}{S} \left(\frac{1}{1+\frac{1}{2}\frac{a}{z_0}}\right) c, \text{ abohms}$$

where $\epsilon$=area of loop and $c$=velocity of light.

An antenna 20 is coupled by loop 22 into the space of the resonator 10. Here again the length of the line between the loop 22 and antenna 20 is not critical provided the impedance of the loop 22 is matched to the line impedance as described above.

A transmission line 30 is connected to the antenna at a point spaced from the antenna end of the line 24 about a half wave length. The transmission line 30 is tuned to the mid-frequency ($f_0$, Fig. 2) of the carrier and is terminated by a rectifier impedance such as, for example, a diode, the cathode 31 of which is coupled to the inner conductor of the line 30 and the anode 33 of which is connected by a resistor 36 and a source of potential 38 to ground. The high potential end of the resistor 36 is coupled to the grounded chamber 10 by an R. F. bypass condenser RF. This end of resistor 36 is also connected to the control grid of an amplifier tube 40, the anode of which couples through a filter network 46 to a resistance 50 coupling the anode 51 of a second diode rectifier to ground through a bias source 52. The resistor 50 and source 52 are shunted by radio frequency bypass condenser RF. The plate potential source for tube 40 is included in 46. The cathode 53 of this diode is coupled by line 48 and loop 49' into the space of a cavity resonator 10. The lines 30 and 48 are both tuned to the mid-band frequency $f_0$ (see Fig. 2) to eliminate the reactance introduced by the diode loads 34 and 51. This would be critical as the frequency swing is increased. A broad band matching device may be introduced to reduce this fault if the frequency swing is large enough to warrant this.

Consider for the time being that the transmitter oscillator 14 operating at 10 cm. wavelength is modulated as to timing and supplies to the resonant cavity 10 the timing modulated oscillations, so that the same are amplified and fed to the antenna 20. This timing modulated output may have a certain amount of amplitude modulation thereon, due, for example, to the response characteristic of the tuned transmission line 24 feeding the antenna. This change in magnitude of the output at the extreme portions of the transmission band is represented by $\Delta A$ in Fig. 2. In this figure $f_0$ is assumed to be the mean frequency of the timing modulated energy while $f_1$ and $f_2$ are the lower and upper limits between which the oscillations are deviated in accordance with signals.

The cavity here is assumed to be tuned to resonance by positioning of the loop 18 and plunger 10 and the transmitter oscillator 14 is the low power device feeding timing modulated oscillations of 10 cm. into the cavity space.

The antenna 20 is also coupled into the cavity, as shown, for a matched condition. The antenna, which is of a broad band type, i. e., for example, one in which the diameter of the dipole is an appreciable part of a wave length, is matched to the surge impedance of the line 24. This may be accomplished by means of a quarter wave transformer. The transmission line 30 is connected to the antenna feeder and is terminated by the diode rectifier 34. The diode is biased through resistance 36 and the source 38, so that conduction occurs through the diode only at some point E or higher in Fig. 3. Point E indicates the clipping limit of the diode 34. During the conduction period the control grid of tube 40 becomes more positive and the plate resistance of tube 40 in shunt to the resistor 50 is decreased. This puts a higher positive (less negative) potential on the plate 51 of the diode and this diode becomes more conductive and a greater amount of load is introduced on the cavity to thereby lower its Q, and reduce its output to the antenna by absorbing energy from the cavity. The bias adjustment on this diode, the value of 36, the gain of 40, etc., can be made such that the loading on the cavity reduces the variations above E to provide a linear timing modulated output. The diode 51—53 may be considered as a variable resistance across an L.-C. circuit. This resistance is variable due to the modulating action of tube 40. Briefly, the system may be described as a means of changing the load resistance into which the cavity can operate. The operation of diode 51 adjusts primarily the amount of R. F. power which feeds the antenna and the amount absorbed by the diode. This proportion may be changed by changing the plate current of the diode which is controlled by tube 40. The bias on 51 may be either positive or negative, depending on the desired conditions. For example, if the modulation factor is small, it would be desirable to bias the diode 51 to cut-off similar to tube 34. Under this condition, a minimum R. F. power would be dissipated in the diode. However, the diode 51 may also be connected positive, thus causing it to be conducting at all times. The coupling of the diode to the cavity is also adjustable, but for most efficient operation, this should be near a matched condition. The type of loading on the cavity through the diode 51, 53 may be varied by a filter type network 46. This may be arranged to give the required correction. Due to the fact that the modulation characteristic of the diode and line 48 will present some non-linear relationship between the modulating frequency introduced at tube 40 and the resultant wave envelope as viewed in line 24. This distortion factor, which may be due to the diode in line 48 and also to a partial determining of the line 48 for a frequency such as $f_1$, can be corrected for by introducing a corrective filter network in the plate circuit of tube 40. In aligning such a system, therefore, the modulation characteristic of the diode operating into the cavity would be obtained and the network 46 designed around this characteristic.

The diode 51, 53 may be replaced by a gas tube with a control grid therein.

In one embodiment a measured frequency swing of 8 mc. per second at an operating mid-frequency of 3000 mc. per second with an amplitude variation of approximately 5% ($\Delta A$, Fig. 2) was obtained. This can be broadened if required, for example, by inserting a small amount of absorbing material, as for example, carbon granules, in the cavity. This lowers the effective Q of the cavity. Its characteristic is a function of the load, cavity walls conductivity and cavity dimensions.

Where desired the system may be used as an absorption type amplitude modulator. Such an arrangement is shown in Fig. 4. In this case the tuned circuit 30 and diode 34, resistance 36, etc., are removed and modulating potentials applied through a coupling condenser to the control grid of tube 40. The transmitter oscillator 14 then is to supply unmodulated oscillations of very high frequency to the resonator 10. The modulator 40 modulates the impedance of diode 51 thereby varying the Q of the cavity and the power absorbed thereby vary the power fed from the cavity resonator to the antenna 20. As a modulator, the diode 51—53 may be either positive or negative, the bias merely determining the effective shunt resistance across the L.-C. circuit 10. The basic idea of modulating a transmitter by this means was tested using a fundamental frequency of 3000 mc. per second. An audio signal was applied across the resistance 50 and the signal was transmitted by a dipole antenna. This was picked up by an untuned crystal detector and the detected amplitude modulated wave was observed on an oscilloscope.

I claim:

1. In a signalling system, a source of timing modulated oscillatory energy of ultra high frequency, a conductive cavity, a coupling between said source of oscillatory energy and said conductive cavity to feed timing modulated oscillatory energy into said cavity, means to derive output energy therefrom, an impedance coupled into said cavity to control the Q thereof to thereby control the magnitude of the output from said cavity, and means for controlling the value of said impedance inversely in accordance with variations in the amplitude of the output from said cavity to remove amplitude variations from the timing modulated output of said cavity.

2. A signalling system as recited in claim 1, wherein said impedance includes the internal impedance between two electrodes in a tube having at least two electrodes.

3. In a signalling system, a source of timing modulated oscillatory energy, a resonant cavity, a feed line coupling said source of oscillatory energy into the cavity, an output circuit coupled into said cavity, said output circuit deriving as output energy therefrom timing modulated oscillations the amplitude of which may vary in an undesired manner, a second coupling into said cavity for deriving a potential representative of variations in the amplitude of the wave energy in said cavity, a third coupling into said cavity, said third coupling including an impedance for loading said cavity to control the Q thereof, and connections for controlling the value of said impedance in accordance with said derived potential to correspondingly control the Q of said cavity.

4. In a signalling system, a source of timing modulated oscillatory energy, a resonant cavity dimensioned to resonate substantially at the mean frequency of operation of said timing modulated energy, a feed line coupling said source of oscillatory energy into the cavity, an output circuit coupled into said cavity, said output circuit deriving therefrom timing modulated oscillations the amplitude of which may vary in an undesired manner, a transmission line connected into said cavity resonator, said transmission line having a terminating impedance in the form of an electron discharge device biased to be non-conductive in the absence of amplitude variations in the output of said cavity, said devices bias being overcome by variations in amplitude of the output of said cavity to produce in said impedance connected therewith a correspondingly varied potential, a second line coupled into said resonator and terminating in an electron discharge tube impedance for loading said resonator to control the Q thereof, and means for controlling the bias of said second electron discharge tube in accordance with the potential drop in said first impedance to lower the Q of said cavity in the presence of amplitude variations in the output of said cavity.

5. In an amplitude modulation system, a source of oscillations of ultra high frequency, a resonant cavity, a coupling between said source of oscillations and said resonant cavity to feed oscillatory energy into said cavity, a coupling extending into the interior of said cavity to derive output energy therefrom, a variable load impedance coupled by a tuned line into said cavity to control the Q thereof to thereby control the magnitude of the output from said cavity, and means for controlling the value of said variable load impedance in accordance with signals to thereby correspondingly vary the Q of said cavity and the magnitude of the output derived from said cavity.

6. In a signalling system, a source of oscillatory energy of ultra-high frequency, a resonant cavity dimensioned to resonate substantially at the mean frequency of operation of said source of oscillatory energy, a feed line coupling said source of oscillatory energy into the resonant cavity, an output circuit coupled into said resonant cavity, a two conductor transmission line coupled by a loop at one end into said resonant cavity, said transmission line having an impedance at the other end including a diode with its cathode connected to one conductor of the line and its anode connected to ground by an impedance, a source of control potential and a tube having input electrodes coupled to said source of control potential and having electrodes coupled to said impedance to vary the potential thereacross in accordance with the control potential to correspondingly vary the conductivity of the diode and the impedance at said other end of the line and the magnitude of the oscillatory energy in said cavity.

7. In a signalling system, a source of timing modulated oscillatory energy of ultra-high frequency, a resonant cavity dimensioned to resonate substantially at the mean frequency of operation of said timing modulated oscillatory energy, a feed line coupling said source of oscillatory energy into the resonant cavity, an output circuit coupled into said resonant cavity, a two conductor transmission line excited at one end by oscillatory energy derived from said resonant cavity, said transmission line having a terminating impedance at the other end comprising a diode with its cathode connected to one conductor of the line and its anode connected to ground by a source of direct current voltage and a load impedance, a second two conductor transmission line coupled by a loop at one end into said resonant cavity, a second diode having a cathode connected to the other end of one conductor of the second line and an anode connected to ground by an impedance and a source of direct current potential, and a tube having input electrodes coupled to said first named impedance and having output electrodes coupled to said second named impedance to vary the potential thereacross in accordance with variations in the potential across said first named impedance.

GEORGE L. FERNSLER.

REFERENCES CITED

The following references are of record in the file of this patent:

UNITED STATES PATENTS

| Number | Name | Date |
|---|---|---|
| 2,294,171 | George | Aug. 25, 1942 |
| 2,288,817 | Maggio | July 7, 1942 |
| 2,114,036 | Smith et al. | Apr. 12, 1938 |
| 2,312,919 | Litton | Mar. 2, 1943 |
| 2,200,962 | McArthur | May 14, 1940 |
| 2,293,945 | Pawsey et al. | Aug. 25, 1942 |

FOREIGN PATENTS

| Number | Country | Date |
|---|---|---|
| 537,518 | England | June 25, 1941 |